United States Patent [19]
Johnson et al.

[11] Patent Number: 6,064,942
[45] Date of Patent: May 16, 2000

[54] ENHANCED PRECISION FORWARD OBSERVATION SYSTEM AND METHOD

[75] Inventors: Mark W. Johnson; David V. Deal, both of Cedar Rapids, Iowa

[73] Assignee: Rockwell Collins, Inc., Cedar Rapids, Iowa

[21] Appl. No.: 08/866,457

[22] Filed: May 30, 1997

[51] Int. Cl.$^7$ .................................. G01S 5/00; H04B 7/00
[52] U.S. Cl. ................ 701/213; 701/207; 342/118; 342/357.01; 342/357.06; 342/357.08; 434/1
[58] Field of Search ........................ 701/213, 214, 701/215, 207; 342/119, 357.06, 357.08, 357.01, 357.02, 357.03, 357.04, 118; 434/1, 2, 11

[56] References Cited

U.S. PATENT DOCUMENTS

| | | | |
|---|---|---|---|
| 5,736,960 | 4/1998 | Murphy et al. | 342/357.02 |
| 5,739,786 | 4/1998 | Greenspan et al. | 342/357.02 |
| 5,757,316 | 5/1998 | Buchler | 342/357.11 |

*Primary Examiner*—William A. Cuchlinski, Jr.
*Assistant Examiner*—Yonel Beaulieu
*Attorney, Agent, or Firm*—Kyle Eppele; James P. O'Shaughnessy

[57] ABSTRACT

An enhanced precision forward observation system and method employs a satellite positioning system receiver, range finder, and a compass/inclinometer. The satellite positioning system receiver is used to calculate an observer's position and target position estimation software employs data from multiple measurements for improved target position estimation.

25 Claims, 13 Drawing Sheets

ENHANCED PRECISION FORWARD OBSERVATION SYSTEM AND METHOD

BACKGROUND OF THE INVENTION

The present invention relates generally to a forward observation system and, more particularly, to an enhanced precision forward observation system and method using a satellite positioning system receiver integrated with a laser range finder and compass. The position may be used with target position estimation software for improved target position estimation.

The forward observation problem involves observing potential enemy targets to determine their location. The technology used in performing forward observation varies from quite basic to very sophisticated.

For example, latitude and longitude may be calculated by an observer located near or at the target site. Such observations may be based on a visual estimate of target position relative to a landmark or other feature of known coordinates, e.g., a feature shown on a map, or by using triangulation techniques. The coordinates of a target may also be fairly accurately calculated by such a person in the vicinity of the target using astronomical or celestial positioning techniques, particularly when there are no landmarks of known position available. Similarly, a person in the vicinity of the target with a satellite positioning system receiver, e.g., a Global Positioning System (GPS) receiver, may be employed for an accurate determination of target position.

Because sending and retrieving an observer from the target vicinity puts the observer at risk of being located by the enemy and creates the potential for fratricide, it would be desirable to provide a system and method for accurate forward observation that can be performed at long range.

Although sophisticated forward observation systems may include a laser range finder, a compass and inclinometer (or other attitude measurement system), and a GPS receiver, or perhaps a radar integrated with a gyroscope, there is no system which addresses the three types of errors inherent in a forward observation target solution, namely, measurement errors, systematic errors, and operator errors.

Measurement Errors.

Existing forward observation systems calculate target location using a single measurement set from a laser range finder, compass, and inclinometer, to obtain range and bearing information about potential targets. This information is used to calculate a directed distance which is then coordinated with maps to plot target coordinates. Such methods provide good distance accuracy, i.e., along track accuracy, due to the accuracy of laser ranging. However, the azimuth or angular measurement accuracy, i.e., cross track accuracy, will generally be poor, given compass inaccuracies (e.g., regional or localized variations between true north and magnetic north) and the multiplicative effect of range on the angular error. The resulting error distribution exhibits elliptical bivariate Gaussian distribution characteristics, with the major axis along the cross track direction. The major to minor axis ratios can be extreme for long range forward observation (approximately 50:1 at four kilometers). This results in a circular error probable (CEP) radius that is nearly the size of the major axis radius, resulting in poor target position estimation. Additionally, with traditional methods, the CEP radius is unknown, resulting in an unknown kill ratio until after firing and impact assessment is complete.

In addition to the measurement errors which occur even if both human and equipment portions of the targeting system work properly, there are systematic and operator errors which can overwhelm all other error sources.

Systematic Errors.

The primary systematic error is the magnetic variance of the compass being used to measure azimuth. This effect can cause very large errors in the compass measurement, e.g., errors greater than 10 degrees. Even with magvar corrections, the applied error can still be several degrees.

Operator Errors.

Operator errors consist primarily of the operator accidentally measuring something other than what was intended. Failure to detect this when performing multiple measurements of the same target could yield dramatic and unknown errors.

It is, therefore, apparent that there exists a need for a forward observation system and method that integrates a laser range finder and an attitude measurement device with a satellite positioning system receiver to provide precise target positioning and overcomes measurement, systematic, and operator error.

SUMMARY OF THE INVENTION

The present invention is a method and system integrating a laser range finder and an attitude measuring device, such as a compass and inclinometer, with a receiver for receiving positioning data from a satellite positioning system, such as the GPS, that produces a solution for all three sources of targeting error (i.e., measurement, systematic, and operator error). The present invention greatly improves target position estimation while providing a known CEP radius before firing.

The satellite positioning system receiver allows very quick determination of observer position. Combining observer position with range to target distance, e.g., using a laser range finder, observer to target azimuth angle, e.g., using a compass, and the observer to target elevation angle, e.g., using an inclinometer, in a Kalman filter allows multiple measurement integration as well as calculation of reliable error statistics, resulting in a known kill ratio before any firing is completed. With existing systems, the error in the target solution is completely unknown until after firing and battle damage assessment is complete.

Combining measurements from two or more observations improves target estimation error, i.e., improves error due to measurement error. Such observations may be made from the same position or from different positions.

If the two or more observations are from the same observation position, the error reduction is due to their combination in a common filtered solution. In this case, the combined error distribution will retain its original elliptical shape, but the noise portion of the error statistics will reduce at a rate of roughly $N^{1/2}$ wherein N is the number of measurement sets that have been filtered.

If the position from which the measurements are taken varies, an additional reduction in estimation error occurs because the angle between the major axes of their elliptical error distributions is equal to the angle between the observations (relative to the target). As the angle between the observations increases, the combined error distribution becomes more circular, thus reducing the CEP. At an angle of 90°, the major axes are perpendicular and the combined distribution becomes a circular bivariate Gaussian distribution ($\sigma_x = \sigma_y$), where the standard deviation is equal to the standard deviation of the minor axis of a single observation elliptical distribution. As long as sufficient angle is swept out (again, relative to the target) between observation points, or if the combined GPS and ranging error is made small enough (making the minor axis of the ellipse very small), dramatic reductions in CEP can occur versus traditional single measurement techniques.

In an especially preferred embodiment according to the present invention, the system includes a magnetic calibration capability, which reduces the magnetic error contribution to 1–3milliradians, thereby virtually removing the systematic errors.

Finally, in yet another preferred embodiment according to the present invention, the targeting system according to the present invention uses measurement statistics to perform a measurement consistency check. This check precludes incorporation of erroneous measurements into the target solution. For example, in a targeting system according to the present invention wherein multiple targets are to be observed simultaneously and wherein target selection is done by the user, the user can be notified of a potentially erroneous measurement. The user may then be given the option of deleting the measurement, assigning it to a new target, or using the measurement with the originally selected target.

BRIEF DESCRIPTION OF THE DRAWINGS

The detailed description of the invention may be best understood when read in reference to the accompanying drawings wherein:

FIGS. 7–10 show mobile observer cases and FIGS. 11–14 depict stationary observer results.

DETAILED DESCRIPTION OF THE INVENTION

Figure 1:
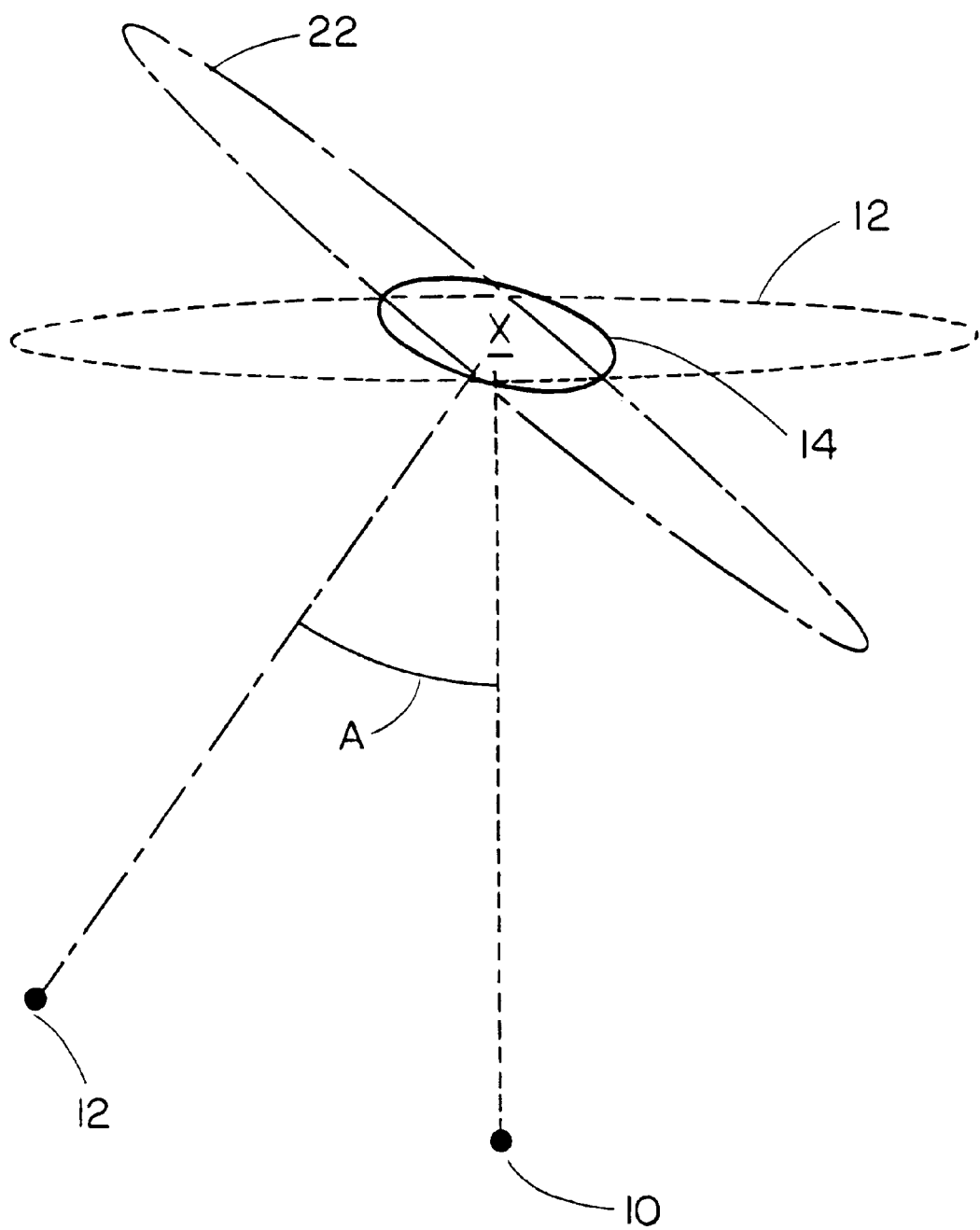
FIG. 1 shows an exemplary error distribution for long range forward observation for two individual measurements taken from different positions and shows the error reduction resulting from multiple measurements.

FIG. 1 depicts, in graphical representation, two-dimensional target radial position error for position solution for target X wherein measurements are taken from two different observation points, points 10 and 20, with the angle swept out between points 10 and 20 represented by reference character A.

The error distribution for target position based on the measurement from observation point 10 is represented by ellipse 12 and the error distribution for target position based on the measurement from observation point 20 is represented by ellipse 22. Since the along track measurement will generally be much more accurate than the cross track measurement, the resulting elliptical error distribution will have a major axis perpendicular to the direction of observation that is much greater than the minor axis along the direction of observation. The major axis may more accurately be described as arc-shaped, however, for long range applications, it approximates a straight line. This approximation is very good for most applications. Where very short ranges are employed, i.e., ranges on the order of 10's of meters, the cross track axis becomes an arc.

The combined error distribution resulting from the two measurements is depicted by ellipse 14. The major and minor axes for the combined distribution 14 are not nearly as disparate as for each individual measurement alone, resulting in a much enhanced CEP. As angle A approaches 90°, the combined error distribution 14 approaches a circle.

Figure 2:
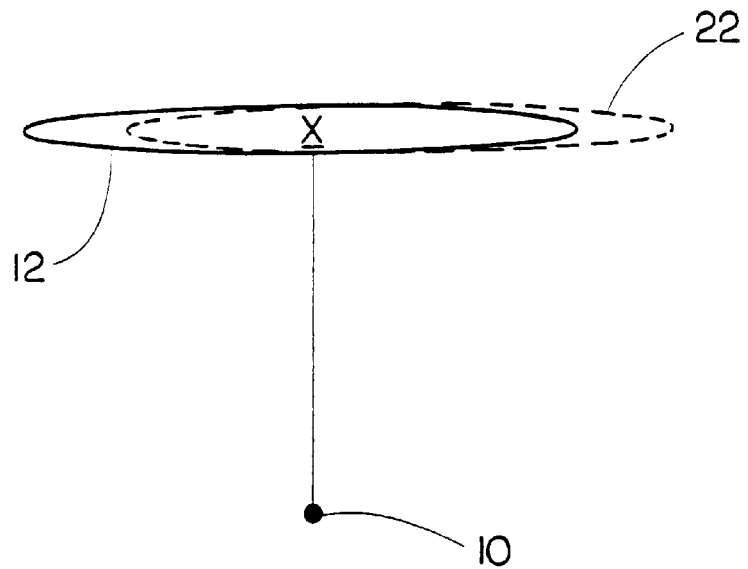
FIG. 2 shows an exemplary error distribution for two measurements taken from the same observation point wherein systematic (azimuth) error may have been a factor.

FIG. 2 depicts the ability of the system and method according to the present invention to reduce systematic errors in the forward observation problem, primarily errors inherent in relying on a compass measurement for determining azimuth. FIG. 2 depicts two elliptical error distributions 12 and 22 based on two measurements of a target X taken from observation position 10. The resulting error distribution is represented by the intersection of ellipse 12 and ellipse 22.

Figure 3:
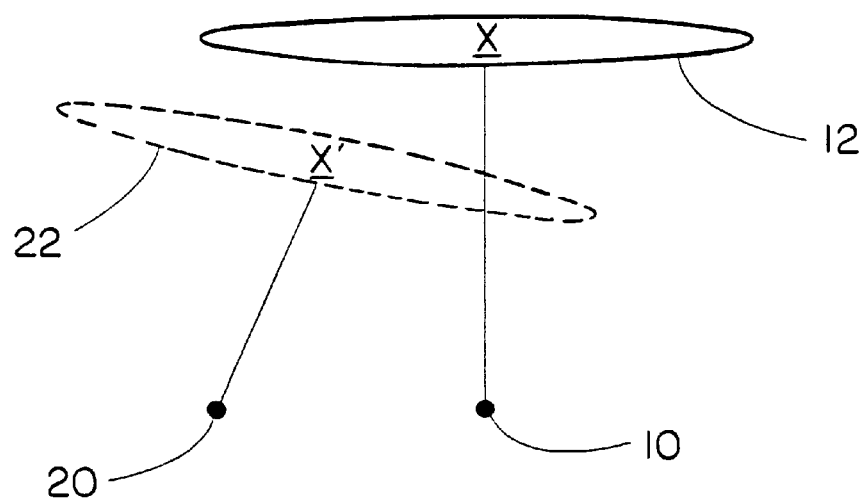
FIG. 3 shows exemplary error distributions for two measurements taken from two different observation points wherein operator error may have been a factor.

FIG. 3 depicts two measurements from two different observation points 10 and 20 wherein the error distributions do not intersect. Such cases are likely when a target X is measured and then an unintended target X' is mistakenly targeted instead of target X. In a preferred embodiment, the system according to the present invention will prompt the operator in such situations for verification of the measurement, as will be discussed below in greater detail with reference to FIG. 5.

Figure 4:
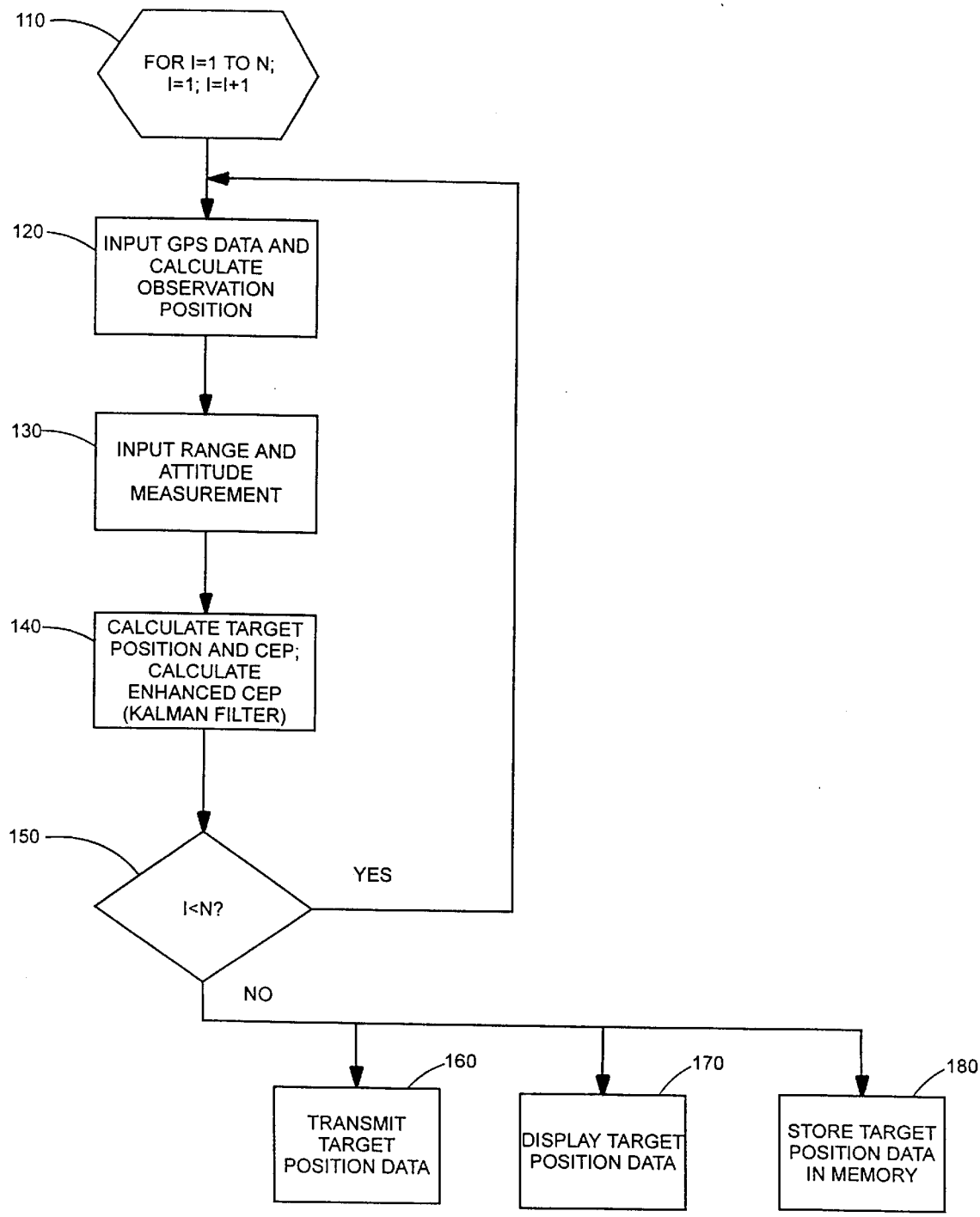
FIG. 4 depicts a flowchart outlining the basic procedure followed by the system according to the present invention.

FIG. 4 depicts a flowchart for calculating target position in accordance with the present invention. Step 110 begins a loop structure which repeats N times, "N" being the number of measurements defined. Satellite positioning system, such as GPS, receiver data output is input and the operator's position is calculated in step 120. Range and attitude instrumentation data is input in step 130. The target position and error distribution relative to the operator position is calculated in step 140 and the Kalman filter is used to determine the enhanced target position estimate. In step 150, it is determined whether the desired number of measurements, "N," have been made. If the desired number of measurements has not been made, the loop structure beginning at step 110 is repeated. If the desired or predetermined number of measurements "N" has been made, the data is transmitted (step 160), displayed on a display monitor (step 170) and/or stored in non-volatile memory for later transmission or for use with subsequent measurements for further refinement (step 180). Also, in step 140, or alternatively, after step 150, the estimated position may be converted from an Earth Centered Earth Fixed coordinate system to an East, North, Up coordinate system. The displayed information in step 170 may be, for example, in the form of a map, e.g., using a terrain database such as a Jeppeson-Sanderson supplied database or the like, with the target coordinates and error distribution displayed thereon. Alternatively, the output may combine a video or photographic image with target coordinates and estimated accuracy superimposed thereon. In step 180 the target position data may be stored in memory for later transmission or uploading, or, the data may be transmitted immediately, as in step 160., e.g., to a weapons delivery system, weapons system operators or the like, via modem, optical link, RF link, IR link, ultrasonic link, or other wireless transmission link.

Figure 6:
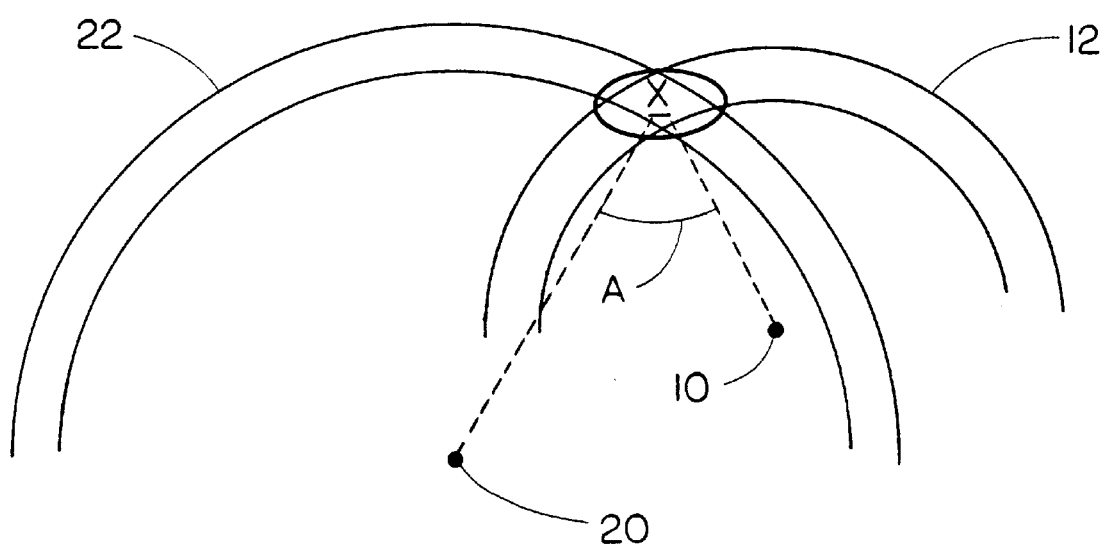
FIG. 6 depicts error distributions for two measurements taken from two different observation points wherein azimuth is unknown.
Figure 7:
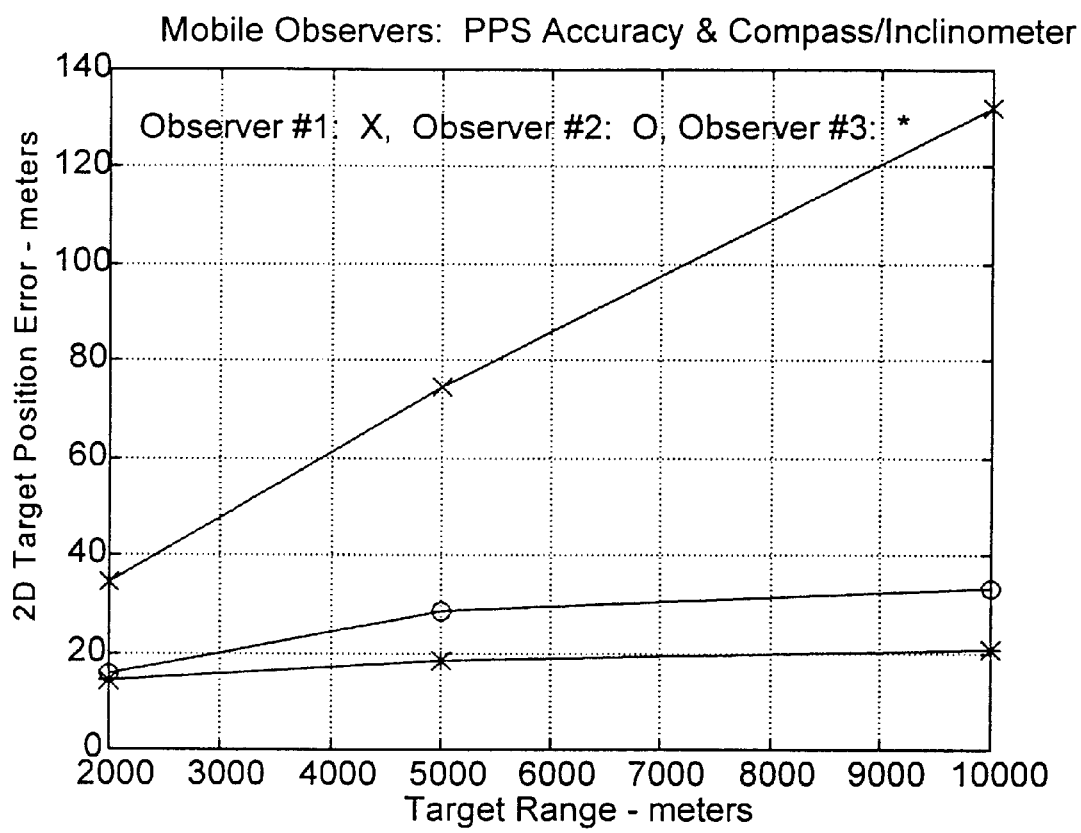
FIGS. 7–14 show average simulated 2-D accuracy performance for 1000 targets is shown after one, two, and three sets of observation measurements have been processed for observer to target ranges from 2 to 10 km.
Figure 8:
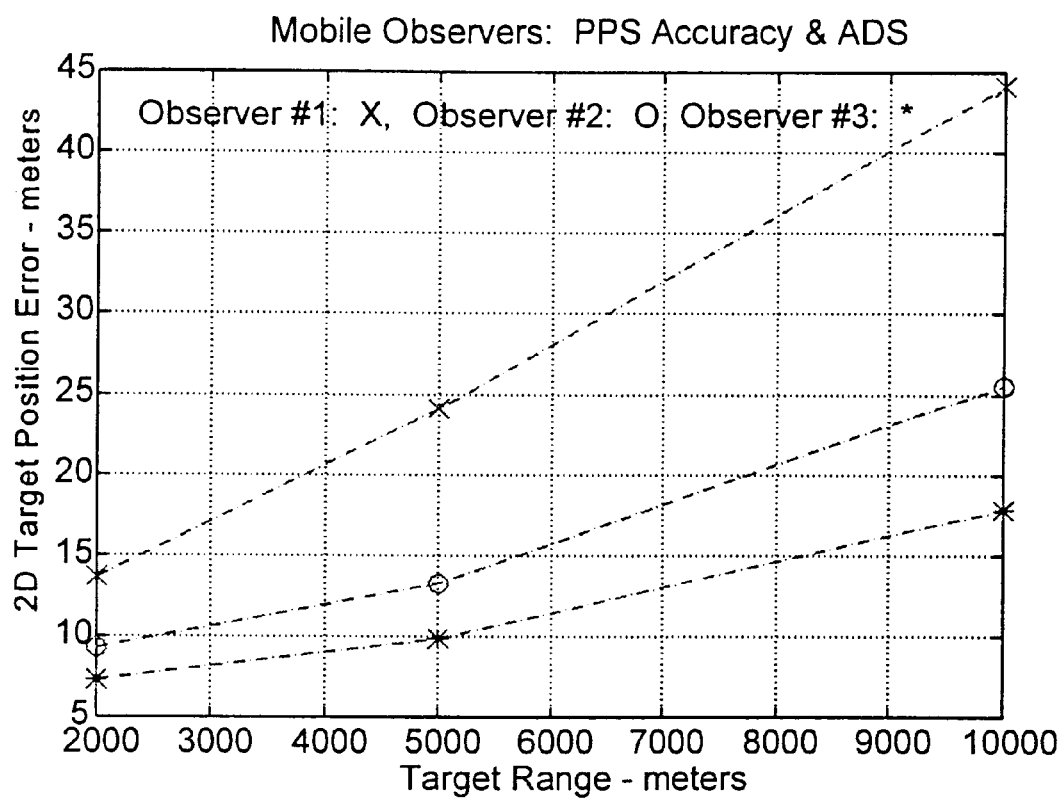
Figure 9:
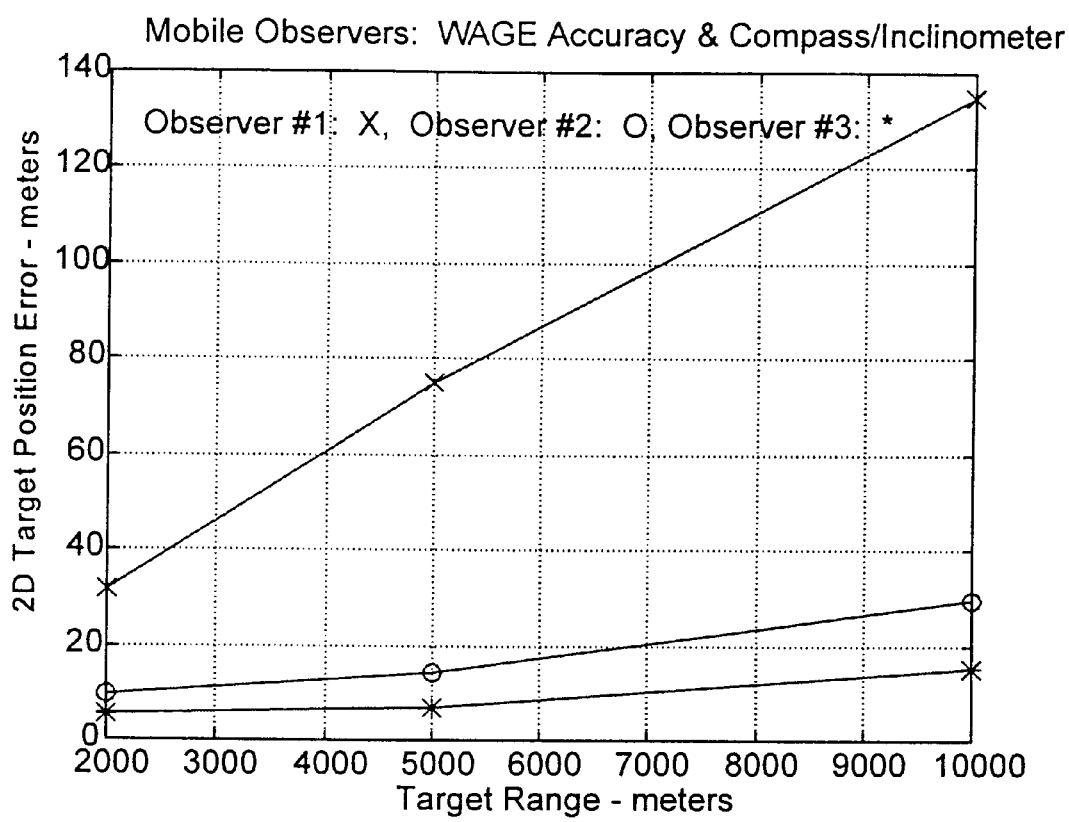
Figure 10:
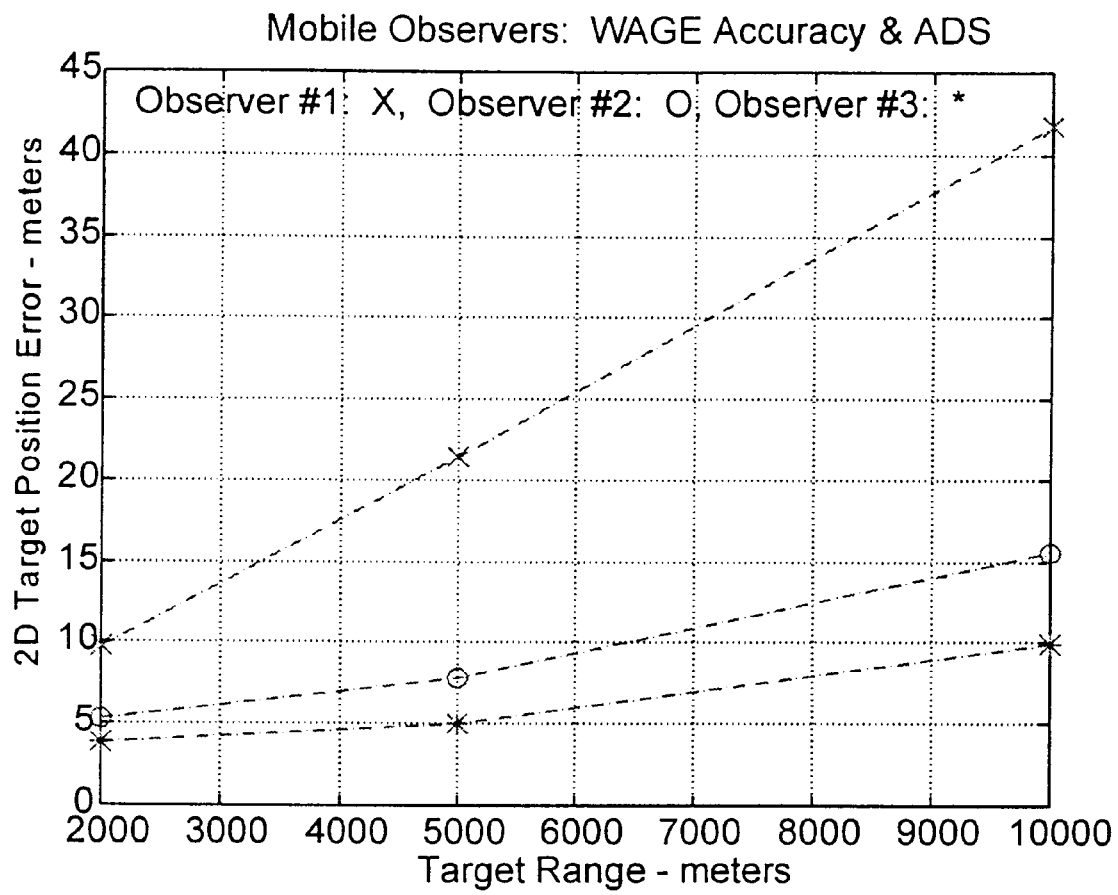
Figure 11:
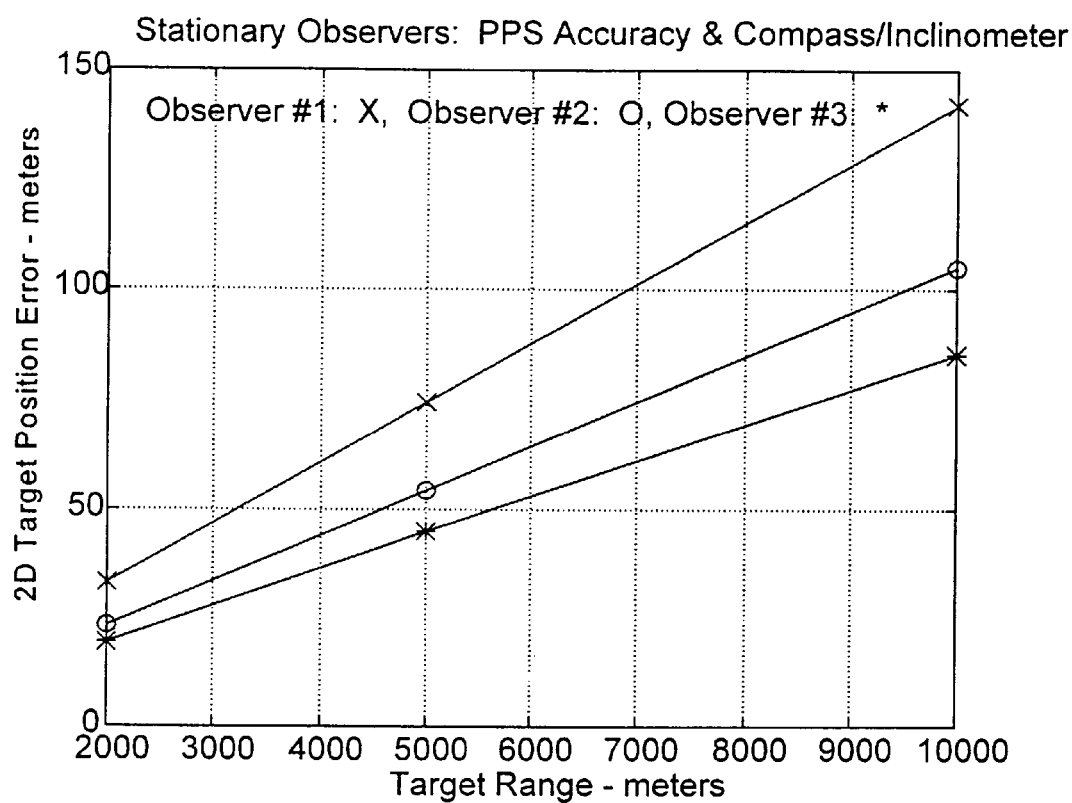
Figure 12:
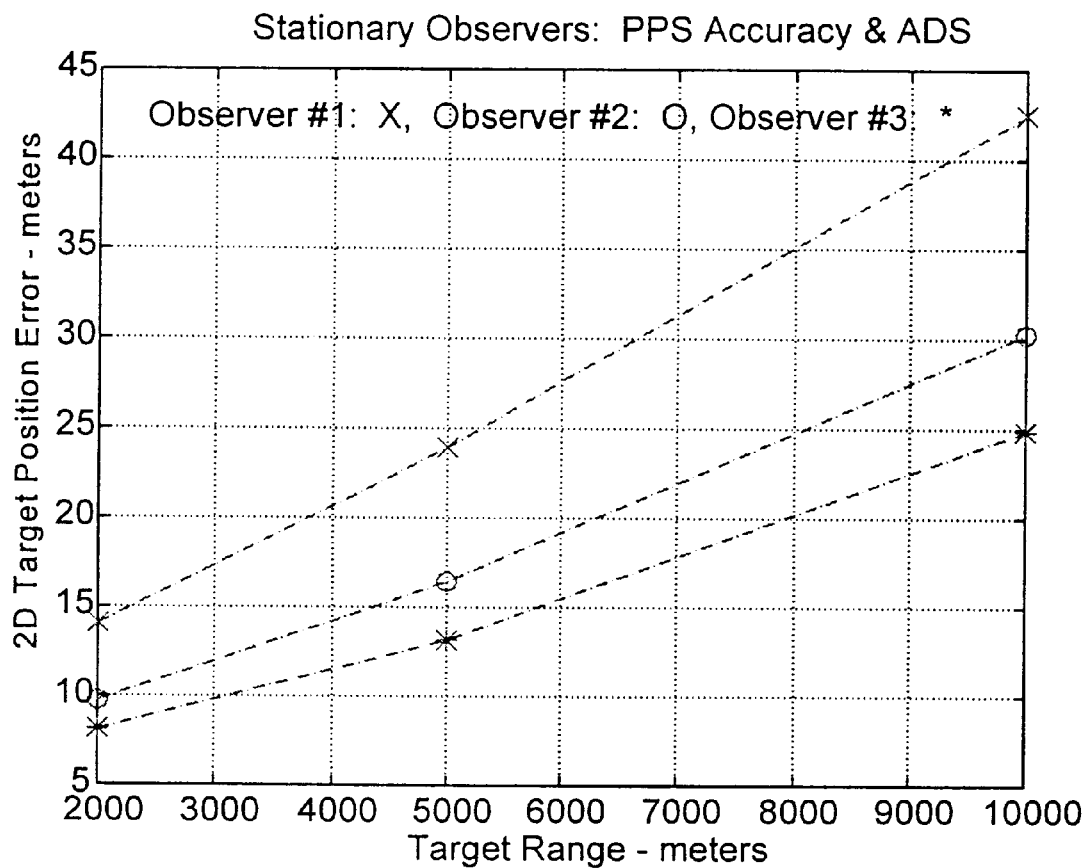
Figure 13:
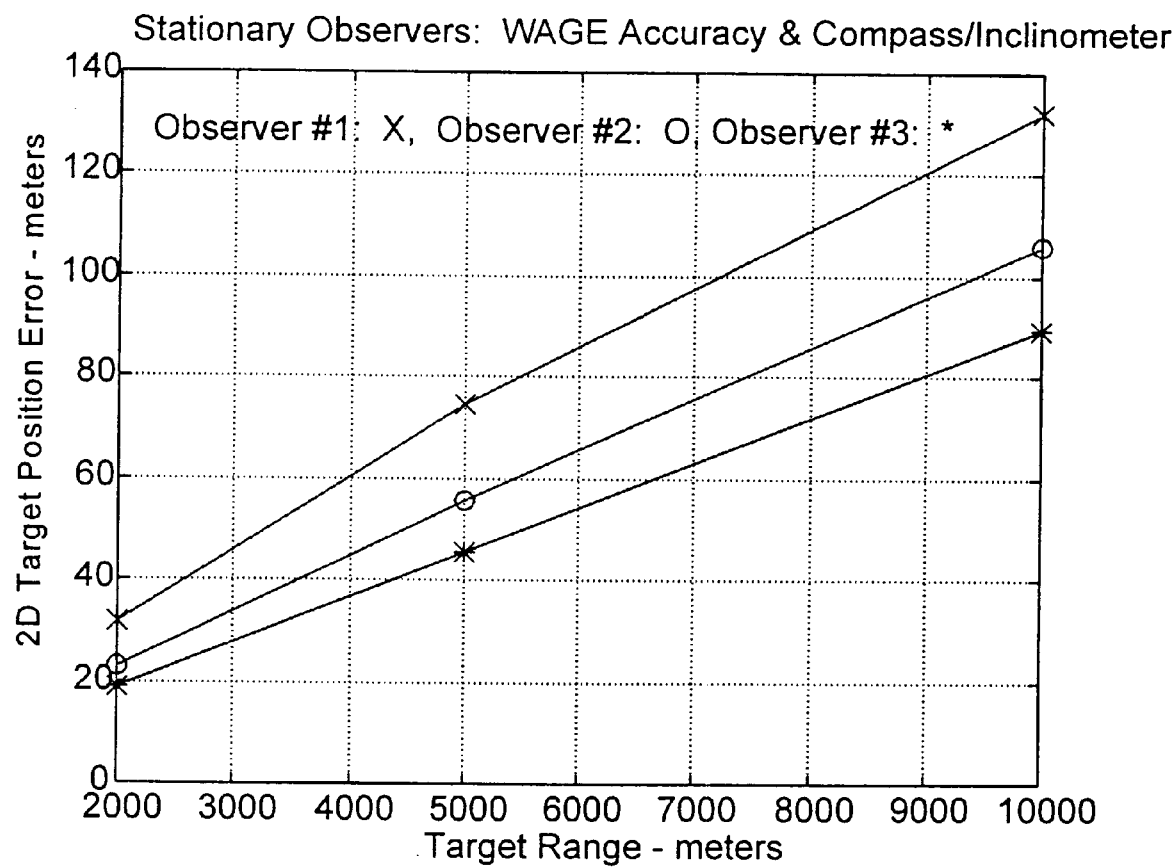
Figure 14:
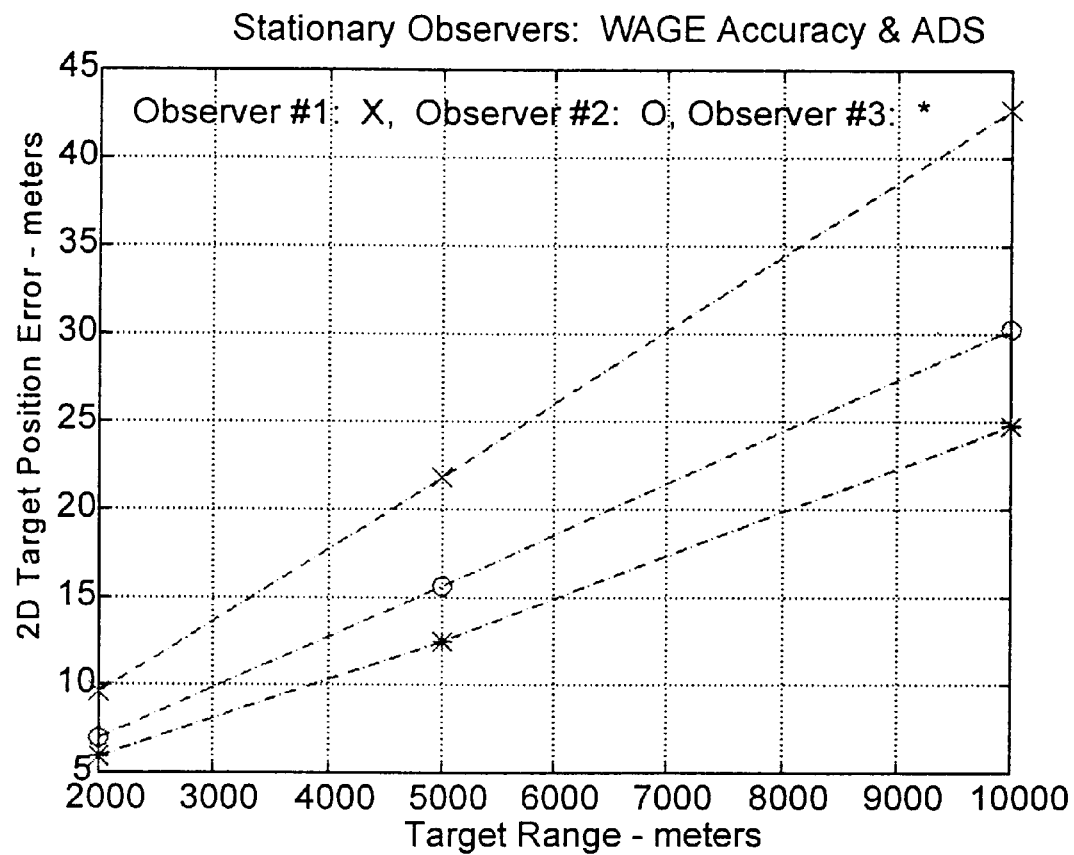

In a preferred embodiment (not shown), if the estimated position calculated in step 140 is not within a predefined range of precision, the user may be prompted for additional measurements. Calibration or correction for magnetic variations may optionally be applied in step 140. Where a plurality of observation points are employed, the need for compass calibration will depend on the accuracy of the range finder. With a very accurate range measurement, little accuracy is needed in the compass measurement, as depicted in FIG. 6.

Figure 5:
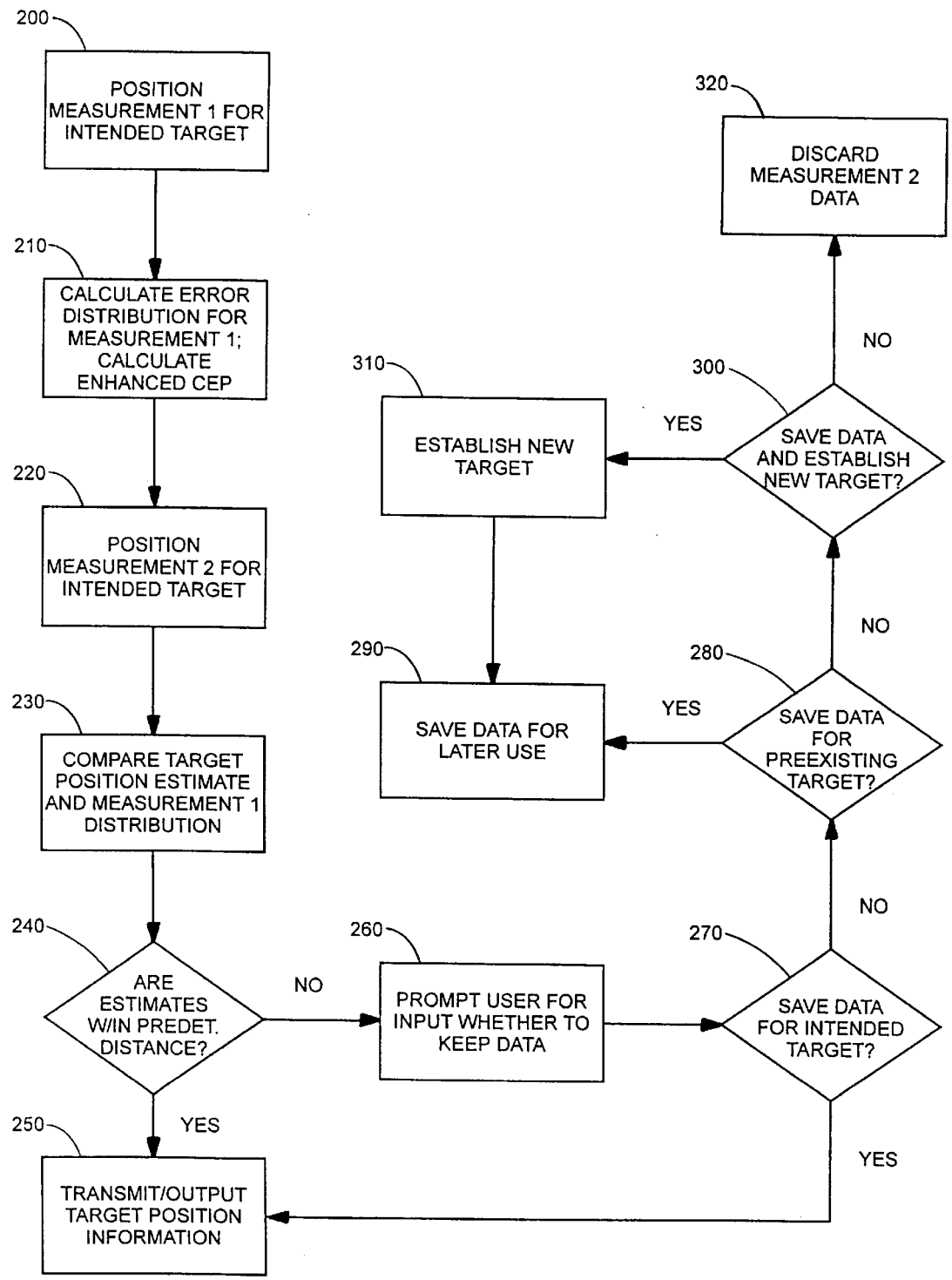
FIG. 5 depicts a flowchart outlining a preferred procedure for identifying potential operator error.

FIG. 5 depicts a flowchart demonstrating an exemplary method of identifying and avoiding potential operator error. In step 200, a first target position measurement employing range finding instrumentation and attitude determining instrumentation is made, and Kalman filtering and CEP calculations are made to determine an estimated target position in step 210. In step 220, a second target position measurement is made and estimated target position is calculated. In step 230, the target position estimates calculated in steps 210 and 220 are compared, and in step 240 a determination of whether the estimates are within a predefined range of distances apart is made. If the estimates are sufficiently close, e.g., if the measurement is within 2σ of the expected or predicted value, then the measurements saved for employment in calculation of further enhanced error distribution using the Kalman filtering process and converted to geographical coordinates and the data is stored, displayed, transmitted, and the like, in step 250. If the position estimates are not sufficiently close, the operator is prompted in step 260 as to whether the data should be kept for the existing target, kept, but applied to another target, or discarded altogether.

If the operator determines that the data for measurement 2 should be kept for the intended target in step 270, the data is then employed or stored for later use in the calculation of the enhanced position CEP of the measured target in step and data is transmitted and/or output (step 250). In a preferred embodiment (not shown), the system may then prompt the operator in step to make a decision whether to keep or discard earlier measurements with respect to earlier acquired and seemingly errant data (e.g., measurement 1 in this example). In this manner, for any two given measurements, any fixed assumption that the first taken measurement is accurate, and the second is not, is avoided.

The embodiment according to the present invention wherein potentially errant data is screened for user verification is particularly useful where a user is making measurements for a plurality of targets during a single observation mission or session. In such cases, a user may not only be alerted to a potential errors in measurement, e.g., due to erroneous target selection, the user may also be provided with a choice of other targets for which one or more observations have been made, with the choice of alternative targets preferably being provided to the user in the order of probable relevance based on their proximity or degree of overlap in their error distributions. The user may direct (e.g., in step 280) that the data be saved for an alternative preexisting target (i.e., a target for which some observations have been made), in which case the data is saved and is applied in an enhanced position estimate calculation, or stored in memory for later application, to an alternative target in step 290. The user may then repeat the second measurement for the originally intended target, if desired (step 220).

If the operator determines that the data is not applicable to the existing target or to any preexisting target for which one or more measurements have been made, the system will preferably provide an option (e.g., in step 260) whereby the operator may establish a new target (step 300). If the operator has indicated that a new target be established in step 300, a new target is established in step 310 and the data is associated with the newly created target is saved (step 290). Thus, a new target may be established in step 310 whereby errant measurement 2, in effect, becomes measurement 1 for the new target. The operator may then return to step 220 , if desired, to repeat measurement 2 for the initially intended target.

If the operator determines that the data based on the questionable measurement applies to neither the intended target nor any other target under current observation, nor is applicable to a site to be designated as a new target, i.e., if the answer in each of steps 270, 280 and 300 is "no," the data may be discarded entirely in step 320, and the user is then given the option of returning to step 220 and obtaining additional data for the intended target, if desired.

FIG. 6 illustrates an exemplary embodiment of the system according to the present invention wherein only a very crude estimate of the azimuth is required. Range measurement from observation point 10 with no azimuth measurement, an arc-shaped error distribution 12' results. A second observation from point 20 wherein an angle A is swept out results in arc-shaped error distribution 22'. Although the combined error distribution for each individual measurement is extremely large, given sufficient range finder accuracy and a sufficient angle A, the combined error distribution results in an enhanced CEP that is a reasonable estimate of target position. If the azimuth for each measurement is completely unknown, the error distributions 12' and 22' would be circular and potentially have two points of intersection. Thus, some azimuth determination, such as within 180°, will be helpful in determining the correct target solution.

Referring now to the calibration of the magnetic variation between magnetic north and true north, or between the magnetic variation (MAGVAR) calibration table in the GPS receiver which is updated approximately once every 5 years, azimuth determination of objects in the targeting region may be employed to provide accuracy beyond that which can be obtained with MAGVAR correction. Even with MARVAR correction, the difference between MARVAR and real offset may be as much as seven degrees. In a preferred embodiment according to the present invention, the difference between a measured azimuth determination (including MAGVAR corrected azimuth determinations) and real offset can be determined and applied to future calculations. In a preferred method, two objects (e.g., stakes, trees, tripods, or the like) are placed or located some distance apart, preferably about 50 meters apart. Next, a line between the two objects is determined, preferably using a time relative positioning technique to traverse between the two objects capable of determining a line between the two points that is accurate to about 3 mils. By determining the time and position of each object and targeting each object from the opposite object, the difference between the compass measurement (or MAGVAR calibration, if employed) and real offset may be determined and applied to future calculations of target position estimates.

Referring now to CEP calculation, an X% Circular Error Probable (CEP) indicates there is an X% probability that the data in question will fall within the radius given. In the case of the targeting system according to the present invention, for example, a 50% CEP of 20 meters for the target solution means there is a 50% chance that the actual target location lies within a circle of radius 20 meters that is centered at the given solution coordinates. As the percentage assigned to the CEP increases, so does the probability that the true position is within a circle of the radius given.

The calculation of the CEP radius for this system is enabled by approximating the target position estimation error as a bivariate Gaussian distribution. At long observer to target ranges this is a very good approximation. For very short ranges (10's of meters) the cross track axis of the elliptical distribution becomes an arc.

The CEP is calculated as follows:
The upper left 2×2 portion of the Kalman filter covariance matrix is diagonalized to find its eigenvalues. These are the major and minor axis variances of the bivariate Gaussian distribution of the target estimation error.

These variances are then converted to CEP's for probabilities of 50%, 1σ, 2σ, and 3σ using tables from W. H. Byer (Ed.), CRC Handbook of Tables for Probability and Statistics, The Chemical Rubber Company, Cleveland, Ohio, pp. 146–148 (1966). Since the table gives only discrete CEP points, a two way linear interpolation is performed to yield an estimate of exactly the 50%, 1σ, 2σ, and 3σ points for exactly the major to minor axis ratio (eccentricity) of the given bivariate Gaussian distribution.

This method was selected to minimize processor throughput (always a concern for handheld GPS applications) while maintaining acceptable accuracy. It was tested with up to 4000 targets (for the 3-sigma CEP test) and yielded CEP estimation errors of a few percent.

Referring now to the Kalman Filter Design, the process under consideration is the position of a target in a local-level, East-North-Up coordinate system at some discrete time k, relative to some observer's position. This can be represented using discrete state space or state variable notation as a column vector with three rows given by the following equation:

$$\underline{T}(k) = \begin{bmatrix} T_{East}(k) \\ T_{North}(k) \\ T_{Up}(k) \end{bmatrix}. \quad (1.1)$$

An alternate formulation, in order to avoid nonlinear equations, would calculate or assume some initial location for the target and therefore only consider movement or errors from that initial location. This can be represented by the following equations:

$$\underline{X}(k) = \begin{bmatrix} \delta T_{East}(k) \\ \delta T_{North}(k) \\ \delta T_{Up}(k) \end{bmatrix}; \quad (1.2)$$

$$\underline{T}(k) = \underline{T}_{initial}(k) + \underline{X}(k). \quad (1.3)$$

The classic discrete state space equation is given as follows:

$$\underline{X}(k+1) = \underline{\Phi}\underline{X}(k) + \underline{\Delta}_1\underline{u}(k) + \underline{\Delta}_2\underline{w}(k) \quad (1.4)$$

where:
  $\underline{X}(k)$ is the state vector, target position error or offset, at time k;
  $\underline{X}(k+1)$ is the state vector one time step in the future;
  $\underline{\Phi}$ is the discrete time system or state transition matrix;
  $\underline{u}(k)$ is the applied control;
  $\underline{w}(k)$ is an unknown random input called plant driving noise;
  $\underline{\Delta}_1$ and $\underline{\Delta}_2$ are influence or input matrices that couple the control & noise into the system.

In this specifc case, there is no control input, the random noise couples directly into the system, and it is assumed that the target does not move. Therefore, equation (1.4) can be reduced to:

$$\underline{X}(k+1) = \underline{\Phi}\underline{X}(k) + \underline{w}(k). \quad (1.5)$$

In addition, equation (1.4) is always accompanied by a measurement equation given by:

$$\underline{Y}(k) = \underline{C}\underline{X}(k) + \underline{v}(k) \quad (1.6)$$

where $\underline{\underline{C}}$ is the measurement or output matrix and $\underline{v}(k)$ is an unknown random input applied to the measurements.

The Kalman Filter is an observer or state estimator for a dynamic process given by equations (1.4) and (1.6). By definition, the Kalman Filter provides an optimal estimate of this system or process by minimizing the mean square error between the actual states and the estimated states. The Kalman Filter has the following form:

$$\hat{\underline{X}}(k+1|k+1) = \hat{\underline{X}}(k+1|k) + \underline{\underline{G}}(k+1) \times [\underline{Y}(k+1) - \hat{\underline{Y}}(k+1|k)] \quad (1.9)$$

where:
1. the notation (k+1|k) refers to the discrete value at time k+1 based on data accumulated through time k;
2. $\hat{\underline{X}}(k+1|k)$ is the estimate of the states given data through time k;
3. $\hat{\underline{Y}}(k+1|k)$ is the estimate of the measurements given data through time k;
4. $\underline{\underline{G}}(k+1)$ is known as the Kalman Filter gain;
5. $\hat{\underline{X}}(k+1|k+1)$ is the estimate of the states given data through time k+1.

A set of recursive equations, in the proper order, that solve for the Kalman Filter gain and equation (1.9) are:

$$\underline{\underline{P}}(k+1|k) = \underline{\underline{\Phi}}\,\underline{\underline{P}}(k|k)\underline{\underline{\Phi}}^T + \underline{\underline{\Delta}}_2\underline{\underline{W}}\underline{\underline{\Delta}}_2^T; \quad (1.10)$$

$$\underline{\underline{G}}(k+1) = \underline{\underline{P}}(k+1|k)\underline{\underline{C}}^T[\underline{\underline{C}}\,\underline{\underline{P}}(k+1|k)\underline{\underline{C}}^T + \underline{\underline{V}}]^{-1}; \quad (1.11)$$

$$\underline{\underline{P}}(k+1|k+1) = [\underline{\underline{I}} - \underline{\underline{G}}(k+1)\,\underline{\underline{C}}]\underline{\underline{P}}(k+1|k); \quad (1.12)$$

$$\hat{\underline{X}}(k+1|k) = \underline{\underline{\Phi}}\hat{\underline{X}}(k|k) + \underline{\underline{\Delta}}_1\underline{u}(k); \quad (1.13)$$

$$\hat{\underline{Y}}(k+1|k) = \underline{\underline{C}}\hat{\underline{X}}(k+1|k); \quad (1.14)$$

$$\hat{\underline{X}}(k+1|k+1) = \hat{\underline{X}}(k+1|k) + \underline{\underline{G}}(k+1) \times [\underline{Y}(k+1) - \hat{\underline{Y}}(k+1|k)]; \quad (1.15)$$

where:
1. P is the covariance matrix of the estimation error;
2. $\overline{\overline{W}}$ is the covariance matrix of the plant driving noise;
3. $\overline{\overline{V}}$ is the covariance matrix of the measurement noise;
4. $\underline{\underline{I}}$ is an appropriately dimensioned identity matrix.

In order to implement the above described Kalman Filter, a mathematical model of this dynamic process was developed, and values for the following parameters were assigned: (1) the discrete time system or state transition matrix $\underline{\underline{\Phi}}$; the measurement or output matrix C; the covariance matrix of the plant driving noise W; and the covariance matrix of the measurement noise V.

Finally, the Kalman Filter required initial values for the covariance matrix of the estimation error P(0/0) and the estimate of the states $\hat{\underline{X}}$ (0/0). These values were selected empirically based on live and simulated test data.

EXAMPLE 1

Table 1 shows a summary of 1000 simulated observer/target data sets. Each target scenario consisted of three randomly located mobile observers (i.e., each measurement taken at a different random location), with ranges up to 7 km, on a single target and includes randomly generated noise that corresponds to assumed measurement and position errors. The score represent the number of times that the target radial position error is within the given 50% CEP radius:

TABLE 1

Simulated Mobile Observer Performance.

| Observation | 2D Target Radial Position Error | Score (50% CEP) |
|---|---|---|
| One | 64.1 meters | 518 |
| Two | 28.1 meters | 521 |
| Three | 24.4 meters | 584 |

As shown in Table 1, the simulated performance yields an average improvement in accuracy of more than 2.5 times for the three observer versus one observer case. Note that the 50% CEP score is a slightly higher than expected for this particular data (it should be 500 if the CEP estimator was perfect), but is still quite accurate.

EXAMPLE 2

Table 2 contains a summary of another 1000 simulated observer/target data sets. This time each target scenario consisted of three randomly located stationary observers (all observations from the same randomly chosen location) on a single target and includes randomly generated noise that corresponds to assumed measurement and position errors.

TABLE 2

Simulated Stationary Observer Performance.

| Observation | 2D Target Radial Position Error | Score (50% CEP) |
|---|---|---|
| One | 62.1 meters | 518 |
| Two | 44.9 meters | 505 |
| Three | 36.4 meters | 508 |

Notice that the improvement in accuracy is not as pronounced this time, because the error distributions for the three observations lie directly on top of each other and no "rounding" of the combined distribution occurs. Rather the error distributions remain elliptical and the error statistics just reduce at a rate of roughly $\sqrt{N}$, where N is the number of measurement sets that have been filtered. In the above data, the errors reduce at almost exactly this rate. ($62.1/\sqrt{2}=43.9$ vs. 44.9, $62.1/\sqrt{3}=35.9$ vs. 36.4).

EXAMPLE 3

The targeting system according to the present invention was rigorously field tested at many locations in the Collins Road, Cedar Rapids area. Although several "targets" were used, the Rockwell Microwave Tower, eventually became the standard target. (More specifically the center of the second large microwave dish became the standard target.) The position of the microwave dish was calculated by surveying in a nearby position (using Rockwell Kinematic GPS) and translating up to the microwave dish itself using the Laser Range Finder. Averaging of extensive data was used to verify existence of, and correct for, any bias errors.

Tables 3 and 4 show the results of two of the field tests. Note that the average slant range to the Rockwell Tower for these tests was 1300 meters and WAGE (Wide Area GPS Enhancement) corrections were being used.

TABLE 3

Mobile Observers-April 9, 1996.

| Observation | 2D Target Radial Position Error | Reported 50% CEP |
|---|---|---|
| One | 16.2 meters | 18.7 meters |
| Two | 3.2 meters | 13.2 meters |
| Three | 1.4 meters | 11.2 meters |

TABLE 4

Stationary Observers-April 10, 1996.

| Observation | 2D Target Radial Position Error | Reported 50% CEP |
|---|---|---|
| One | 22.8 meters | 18.3 meters |
| Two | 17.5 meters | 13.2 meters |
| Three | 8.5 meters | 11.4 meters |

The data from the live tests exhibits the same general behavior as seen in the simulated tests: multiple, mobile observations provide a more accurate estimate of the target's position when compared to multiple, stationary observations. As in the simulated case, the errors for the stationary case reduce at a rate of about $\sqrt{N}$, where N is the number of observation data sets.

The accuracy achieved by the live tests shown here is clearly better than that of the simulated tests. This is primarily because the nominal range to the target is only 1.3 km versus up to 7 km for the simulated tests. Also, since error values are statistical in nature, certain cases will be better than others. It should be noted, however, that the simulated data reported in Tables 1 and 2 is the average of two 1000 case simulations and is thus quite statistically sound, whereas the live data shown in Tables 3 and 4 are for single cases and, thus, are do not necessarily represent a statistically valid measure of average performance. On the whole, however, the live data compared very favorably with simulated results, allowing for reasonable statistical variance.

The reported 50% CEP's from the live tests appear too pessimistic when compared with the simulated test results. This is the result of two effects. First, the measurement errors assumed in the Target Calculator are believed to be a little larger than the actual errors experienced (i.e., a perfect estimate of measurement errors is difficult to obtain). From a safety perspective, it was decided that erring on the conservative side was preferable to being too aggressive. The other likely effect making the CEP estimates look too pessimistic is again the fact that error values are statistical in nature. Thus, the simulated data reported in Tables 1 and 2 is statistically sound, whereas the live data shown in Tables 3 and 4 are for single cases and are therefore likely to have greater variation from average performance. On the whole, once again, the live data compared very favorably with simulated results.

It should also be noted that the live tests were constrained by the 2.5 km maximum range of the laser range finder being used for testing as well as the ability to locate long range visible line of sight targets within the Cedar Rapids area.

EXAMPLE 4

A sophisticated Matlab simulation model has been developed that will generate target and observer data sets for any set of constraints. It also simulates system performance to allow tradeoffs of all components for a wide range of application scenarios. This allows cost optimization by trading off expensive components for inexpensive ones, while maintaining desired performance.

Potential system performance for a wide range of assumptions is shown in FIGS. 7 through 14. In each case the average simulated 2-D accuracy performance for 1000 targets is shown after one, two, and three sets of observation measurements have been processed for observer to target ranges from 2 to 10 km. The average accuracy consistently improves as more observations are performed, and thus the top (least accurate) line represents results after one observation and the bottom line represents results after three observations. FIGS. 7–10 show mobile observer cases (random observation positions sweeping out ≦90° relative to target). FIGS. 11–14 show stationary observer results. In FIGS. 7, 8, 11, and 12, GPS Precise Positioning Service (PPS) accuracy is used and in FIGS. 9, 10, 13, and 14, Wide Area GPS Enhancement (WAGE) accuracy is used. Additionally, the azimuth accuracy, i.e., either compass/inclinometer or GPS Attitude Determination System (ADS) is varied as labeled.

As shown, more accurate measurements, either positioning or angular, or, observer motion relative to the target, improves system performance. In many cases, of course, more accurate positioning may be less expensive than more accurate angular measurements and may thus provide a cost effective tradeoff. In other applications where two or more observations are used that sweep out 90 degrees relative to the target, a very low quality azimuth measurement can be used while maintaining very good performance (see FIG. 6). Thus, either a large sweep angle relative to the target or better positioning accuracy with small sweep angles, can often be used in place of stationary measurements with more accurate azimuth. This can be seen by noting that the mobile observer accuracy is consistently better than the stationary observer accuracy.

Although the forward observation system according to the present invention has primarily been described herein as a military forward observation and target determination system, the present invention is not limited to such. Additional targeting applications include application to multi-radar counterbattery targeting systems and rifle integration for sniper teams. Simulations have shown a dramatic improvement in targeting accuracy achievable by integrating highly accurate GPS with multiple radar measurements for the counterbattery application, and likewise show very good results for the sniper team forward observation application.

Other potential applications include remote surveying, asset management, preparing accurate GPS reference maps, and the like. The primary remote survey and asset management users are government agencies that want to tabulate locations of multiple assets from a single location (such as sitting on a hill and remotely surveying all visible freeway overpasses), and those who want to locate objects that are difficult to reach (in a swamp, high on a hillside or mountainside, etc.). The potential applications of this technology extend to any application wherein a calculation, with a known accuracy, of the location of a remote object is desired. Additionally, the targeting system according to the present invention may be integrated with a camera system to provide cataloging of photograph, location where the picture was taken, and location of the item in the picture (with an estimated accuracy of the item's location data) for items of interest.

The system according to the present invention may be employed as a stand alone dedicated hardware device, e.g., for hand held use, or may likewise be employed in conjunction with, or as an enhancement to, an aircraft flight management system, employing the aircraft's navigation instrumentation. The system may be employed as a forward observation based enhancement for preventing controlled flight into terrain (CFIT), and may be used in addition to or as an enhancement to a Ground Proximity Warning System (GPWS) or a Ground Collision Avoidance System (GCAS). The system also finds utility in monitoring and controlling air space or water ways, e.g., for air traffic control, harbor control, and the like. The system according to the present invention may likewise be employed for locating under water targets or for mapping underwater terrain. Also, the system according to the present invention may be employed via an unmanned ground vehicle.

Although the above exemplary embodiments are described as employing a laser range finder, ranging data may additionally be obtained through, for example, radar, sonar, other radio ranging, physical measuring, synthetic aperture radar, and the like.

Methods of obtaining observer position data, include navigational systems such as satellite based positioning systems such as GPS Precise Positioning Service (PPS), GPS Standard Positioning Service (SPS), Global Navigation Satellite System (GNSS), Global Orbiting Navigation Satellite System (GLOSNASS), GNSS-2, and the like; inertial devices; ground-based positioning systems; such as LORAN, LORAN C, OMEGA, other radio navigation systems, and the like; terrain correlation systems; radar correlation systems; dead reckoning; odometer with compass or inertial system; pedometer with compass or inertial system; celestial position determination, or any combination of the above, and the like.

Although the present invention has been described with respect to a CEP estimator, a preferred embodiment according to the present invention employs a Spherical Error Probable (SEP) estimator to calculate 3-D error estimation, since target position is already calculated in three dimensions. In calculating SEP, the elliptical error distributions are replaced with three-dimensional ellipsoids. In reference to FIG. 1, ellipses 12 and 22 which depict range and cross-track accuracy would be replaced with ellipsoids with a third (semi-minor) axis extending perpendicular to the plane of the page representing inclination or elevation accuracy.

The forward observation system according to the present invention also provides the ability to observe and locate targets that are moving. By sampling the position of a moving target at discrete time intervals, the estimated positions can be analyzed using a Kalman filter to determine the target's path of motion and to project a target location to a point in time, within a determined error range, thus allowing unprecedented targeting and artillery integration.

In an especially preferred embodiment, the forward observation system according to the present invention is integrated with a data link. Integration with a data link allows the observer to use code or carrier phase corrections (to perform differential GPS or Kinematic GPS, respectively) as well as allowing observation measurements to be shared between forward observers. This greatly enhances accuracy and reduces the need for forward observer movement while providing maximum rounding of the combined error distribution. This embodiment serves the initiative of protecting the force by allowing forward observers to remain stationary in covered positions, thus reducing their vulnerability.

In another especially preferred embodiment, the system according to the present invention is integrated with Rockwell's Precise Position Service Attitude Determination System (ADS). With ADS replacing the compass, the azimuth accuracy is greatly improved (which greatly improves targeting accuracy) and the need to calibrate azimuth is removed.

Although the invention has been described in connection with certain particular and preferred embodiments thereof, it would be evident to those skilled in the art that various revisions and modifications of the herein described embodiments, as well as many additional applications to those described by way of example herein can be made without departing from the spirit and scope of the invention. Accordingly, scope of the invention should be determined solely by the appended claims and their legal equivalents.

What is claimed is:

1. A forward observation system for determining the location of a target comprising:

(a) instrumentation for determining an observer position;

(b) a range finder for determining the distance to the target from the observation position;

(c) instrumentation for determining the attitude of the line of sight vector to the target from the observation position;

(d) a processor for receiving output from said instrumentation for determining an observer position, said range finder, and said instrumentation for determining the attitude of the line of sight vector to the target, said processor comprising means for calculating an estimated target position and determining error range.

2. The forward observation system according to claim 1 wherein said instrumentation for determining observer position comprises satellite based positioning system receiver.

3. The forward observation system according to claim 1 wherein said range finder comprises a laser range finder.

4. The forward observation system according to claim 1 wherein said instrumentation for determining the attitude of the line of sight vector to the target comprises a compass and inclinometer.

5. The forward observation system according to claim 1 wherein said means for calculating an estimated target position and determining error range comprises an estimation filter.

6. The forward observation system according to claim 5 wherein said estimation filter comprises a Kalman filter.

7. The forward observation system according to claim 6 wherein said instrumentation for determining observer position comprises satellite based positioning system receiver.

8. The forward observation system according to claim 7 wherein said range finder comprises a laser range finder.

9. The forward observation system according to claim 6 wherein said instrumentation for determining the attitude of the line of sight vector to the target comprises a compass and inclinometer.

10. The forward observation system according to claim 2 wherein said means for calculating an estimated target position and determining error range comprises a Kalman filter; said instrumentation for determining observer position comprises satellite based positioning system receiver; said range finder comprises a laser range finder; and said instrumentation for determining the attitude of the line of sight vector to the target comprises a compass and inclinometer.

11. The forward observation system according to claim 10 further comprising magnetic variation data for calibration of said compass and inclinometer.

12. The forward observation system according to claim 1 further comprising a measurement error detector for alerting a user when a target position estimate varies from an expected value by more than a prespecified amount.

13. The forward observation system according to claim 12 wherein said measurement error detector alerts a user when said target position estimate varies by more than $2\sigma$ from said expected value.

14. A method for determining the coordinates of a target position comprising the steps of determining a target position estimate and error range for said target position estimate by making distance and attitude measurements relative to a given observation position having determinable coordinates; determining the observation position coordinates of the observation position; and using said observation position coordinates, said distance and attitude measurements, and a Kalman filter to determine coordinates and error range for said target position estimate.

15. A method for determining the coordinates of a target position from one or more observation positions comprising the steps of:

(a) making distance and attitude measurements of said target position relative to a given observation position having determinable coordinates;

(b) determining the observation position coordinates of the observation position;

(c) using said observation position coordinates, distance and attitude measurements from step (a), and a Kalman filter to determine coordinates for a first target position estimate and error range for said first target position estimate;

(d) determining at least one other target position estimate and error range for said at least one other target position estimate by making distance and attitude measurements relative to at least one observation position having determinable coordinates;

(e) determining the observation position coordinates for each step (d) observation position;

(f) and using the step (d) observation position coordinates, the corresponding distance and attitude measurements, and a Kalman filter to calculate an enhanced target position estimate and enhanced error estimate using the first target position estimate from step (a) and said at least one other target position estimate from step (d);

(g) logging target position information comprising enhanced target position estimate and error distribution calculated in step (f).

16. The method according to claim 15 wherein the observation position of step (a) and at least one observation position in step (d) are the same.

17. The method according to claim 15 wherein the observation position of step (a) and at least one observation position in step (d) are different.

18. The method according to claim 15 wherein the line of sight vector to the target from the observation position in step (a) and the line of sight vector to the target from at least one observation position in step (d) form an angle ranging from about 45 degrees to about 135 degrees.

19. The method according to claim 18 wherein the line of sight vector to the target from the observation position in step (a) and the line of sight vector to the target from at least one observation position in step (d) form an angle of about 90 degrees.

20. The method according to claim 15 wherein the observation position coordinates are determined by a satellite positioning system.

21. The method according to claim 15 wherein at least one attitude measurement is calibrated to correct for regional magnetic variations between magnetic north and true north.

22. The method according to claim 21 wherein at least one attitude measurement is calibrated with values for regional magnetic variations stored in a database.

23. The method according to claim 21 wherein at least one attitude measurement is calibrated by determining the magnetic variation of a region, comprising the step of determining a line between two objects of known position within said region.

24. The method according to claim 15 further comprising the step providing an alert when a target position estimate varies from an expected value by more than a prespecified amount.

25. The forward observation system according to claim 24 wherein said alert is provided when said target position estimate varies by more than $2\sigma$ from said expected value.

* * * * *